July 18, 1944. P. W. THORNHILL 2,353,977
PACKING DEVICE FOR FLUID PRESSURE APPARATUS
Filed May 24, 1943
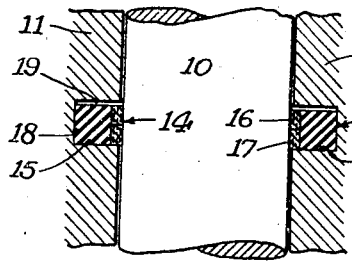
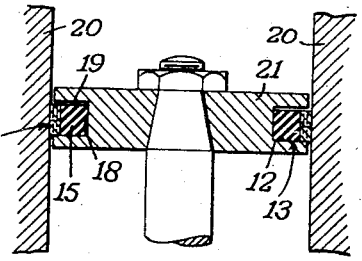
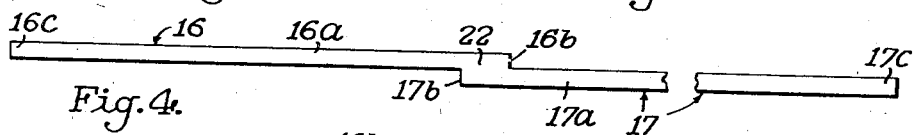
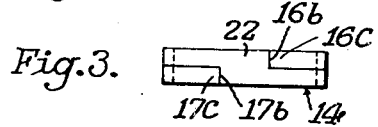
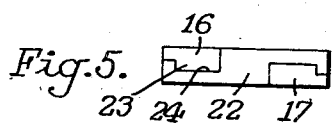
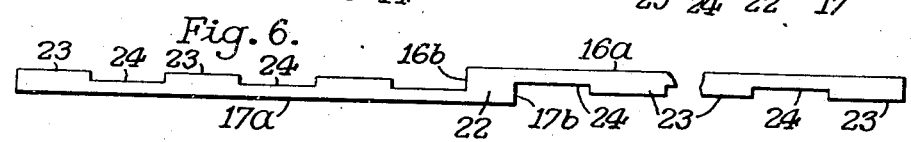
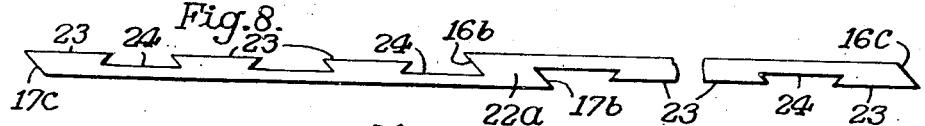
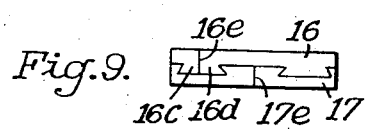
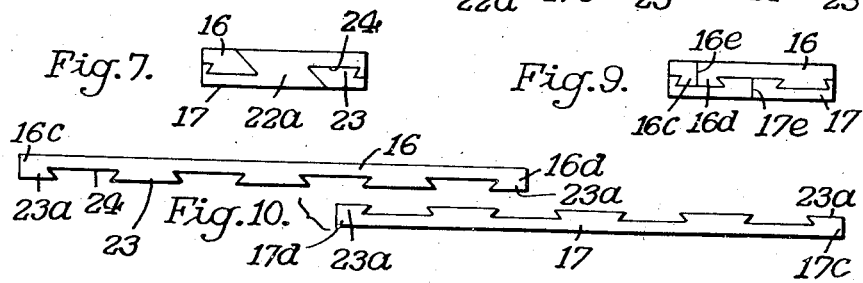
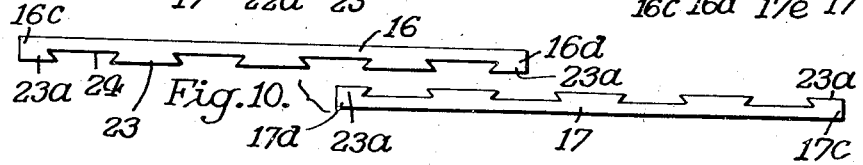
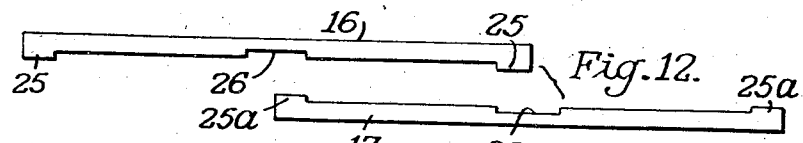
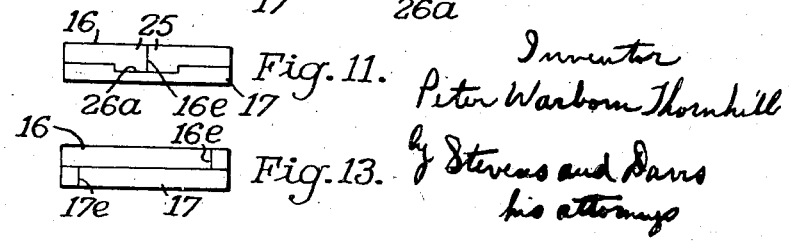

Patented July 18, 1944

2,353,977

UNITED STATES PATENT OFFICE 2,353,977

PACKING DEVICE FOR FLUID PRESSURE APPARATUS

Peter Warborn Thornhill, Leamington Spa, England, assignor to Automotive Products Company Limited and The Ribbesford Company Limited, both of Leamington Spa, England Application May 24, 1943, Serial No. 488,261
In Great Britain July 3, 1942

14 Claims. (Cl. 288—18)

This invention relates to packing devices for fluid pressure apparatus, and more especially to packing devices for relatively moving parts such as pistons or plungers operating in cylinders, the packing being of the kind which is seated in a groove or recess in one of the members between which the packing is provided, and presses resiliently against the surface of the other member.

The object of the invention is to provide a packing device of the kind referred to, which has good wearing properties and is simple to manufacture and assemble.

According to the invention an annular packing device is provided comprising in combination with a backing ring of soft rubber or the like, a facing element separate from the backing ring, which facing element is composed of fibrous material in terminate strip form, wound to produce a plurality of turns lying side by side in edge contact with one another, each end of the strip-like fibrous material being arranged to meet substantially another part of said material to form a butt joint, which latter is displaced around the circumference of the facing element with respect to the other butt joint or joints in the fibrous material. It will be understood that the parts of the strip-like fibrous material which constitute a butt joint may actually be separated slightly without rendering the packing device ineffective, as the gaps of the respective turns will be out of register with one another. The term butt joint is therefore intended to include cases in which the end of the strip-like material touches, or bears circumferentially against, another part of said material and also where the said end lies alongside the said other portion but is actually separated therefrom by a narrow gap.

There is further provided according to the invention an annular packing device comprising in combination with a backing ring of soft rubber or the like, a facing element separate from the backing ring, which facing element is composed of textile material in terminate strip form impregnated with rubber or like substance and wound to produce a plurality of turns lying side by side in edge contact with one another, each end of the strip-like textile material being arranged to meet substantially another part of said material to form a butt joint, which latter is displaced around the circumference of the facing element with respect to the other butt joint or joints in the textile material.

As a further aspect of the invention the improved annular packing device comprises in combination with a backing ring of soft rubber or the like a facing element composed of a plurality of terminate strips of fibrous material, such as canvas, wound to form a plurality of turns which are disposed side by side in edge contact with one another and are interposed between the backing ring and one of the members between which a seal is desired.

As another aspect of the invention an annular packing device is provided comprising in combination with a backing ring of soft rubber or the like, a facing element comprising a terminate strip of fibrous material such as canvas wound to form a pair of turns which are disposed side by side in edge contact with one another and are interposed between the backing ring and one of the members between which a seal is desired, the strip being offset at the middle of its length to provide a pair of shoulders against which the ends of the strip are arranged to substantially butt.

Moreover the improved packing device may comprise in combination with a backing ring of soft rubber or the like, a facing element comprising a plurality of turns of strip-like fibrous material, the strip material of consecutive turns being laid edge to edge around a curved surface of the backing ring and being shaped with projections and recesses which mate to interlock the turns with one another and prevent relative movement of the turns circumferentially.

There is still further provided according to the invention an annular packing device comprising in combination with a backing ring of soft rubber or like material, a facing element composed of a pair of turns of fibrous material in strip form laid edge to edge around a curved surface of the backing ring, each end portion of the facing element being increased in width to engage with a recess in the strip constituting the other turn of the facing element.

In all cases the backing ring is preferably endless, although it may be in the form of a terminate strip wound into one or more turns.

The turns of the facing element may be interlocked against axial and circumferential displacement relative to one another, and for this purpose said facing element may have its turns formed with inter-engaging projections and recesses which are of undercut shape, such as dovetail shape. In all its forms the facing element may be advantageously composed of strip material comprising a plurality of thicknesses of canvas or like textile material united together and impregnated with rubber or like material.

The invention is illustrated by way of example in the accompanying diagrammatic drawing, in which:

Figure 1 is a sectional elevation of the packing fitted into a housing for co-operation with the exterior of an axially slidable piston rod or the like;

Figure 2 is a similar view showing the invention applied to a piston in a cylinder;

Figure 3 is a side elevation of one form of facing element in its assembled form;

Figure 4 is a view showing the shape to which the facing element in Figure 3 is initially cut before being wound during assembly;

Figures 5, 7, 9, 11 and 13 are views similar to Figure 3 but showing modified constructions of facing element; and Figures 6, 8, 10 and 12 are views showing the initial shape of the facing elements in Figures 5, 7, 9 and 11, respectively.

In the arrangement shown in Figure 1 a piston rod or like member 10 is arranged to slide through a housing 11, which latter is formed at 12 with an internal annular groove containing the improved packing device, which is indicated generally at 13. The packing device as shown is intended to prevent leakage of fluid in a downward direction along the surface of the rod 10, and it comprises two separate portions, namely a facing element 14 arranged to engage the sliding surface of the rod 10, and a backing ring 15, which latter occupies the greater part of the groove 12.

The facing element 14 essentially comprises a plurality (usually two) of turns of strip-like fibrous material, such, for instance, as laminated canvas or like textile material impregnated with rubber or any of the relatively flexible materials normally used for impregnating canvas and like packing rings. In Figure 1 two turns are shown and are indicated at 16 and 17. The strip-like turns are laid side by side with their adjacent edges in contact with one another so as to form a parallel-sided band which fits snugly or with appreciable looseness within the mouth portion of the rectangular section groove 12. The facing element 14 may take various forms, as will be described later, but in each case the turns are composed of strips which are terminate, i. e. provided with ends. The turns are not in the form of endless bands.

The backing ring 15, on the other hand, comprises an endless ring of soft rubber or other substitute or synthetic material having similar characteristics. It is rectangular in cross-section and it is preferably so dimensioned initially that, when assembled, it is an interference fit between the outside of the facing element 14 and the bottom 18 of the groove 12. In axial width, however, it is, when assembled, preferably slightly narrower than the width of the groove, thus leaving a space 19 within which the fluid pressure to be sealed can act so as to compress the ring 15 in an axial direction, thereby causing it to press more strongly upon the facing element 14. Instead of or in addition to this interference of the backing ring, said ring may be compressed axially by a spring or other means (not shown) so as to tend to spread the ring in a radial direction.

In cases where the packing is required to co-operate slidably with an internal surface, for instance a cylinder 20, as shown in Figure 2, the facing element 14 is arranged to co-operate with the outer curved surface of the backing ring 15. As shown in Figure 2, a piston 21 has its periphery formed with the rectangular section groove 12 within which the backing ring 15 is located, said backing member being arranged, when assembled, to press upon the bottom 18 of the groove and outwards upon the facing element 14 so as to squeeze the latter into fluid-tight engagement with the wall of the cylinder 20. The axial width of the facing element 14 and the backing ring 15 is also arranged so as to leave a space 19 within which the pressure fluid to be sealed can act, thus squeezing the backing ring 15 axially and causing it to tend to expand in a radial direction.

Figures 3 and 4 show one method of constructing the facing element 14. A strip of laminated fabric or like fibrous material is formed, of the shape shown in Figure 4, said strip comprising two halves 16a and 17a which are connected together by an offset portion 22. The width of the offset portion 22 is arranged to be substantially the same as the axial thickness of the backing ring 15 when the device is assembled, while the parts 16a and 17a are each substantially half that width. It will be seen that the offset portion 22 produces a pair of shoulders 16b and 17b, and when the strip is wound to the tubular form shown in Figure 3 the outer ends 16c and 17c come into register with the shoulders 16b and 17b, producing what are herein referred to as butt joints. Actually, of course, the ends are not joined to the shoulders 16b and 17b and there may in fact be a slight gap in one or each instance. The butt joints at the shoulders 16b and 17b are, of course, displaced from one another in a circumferential sense, so that even if there is a gap, this cannot allow pressure fluid to pass freely from one side of the packing to the other. It will be understood that Figure 3 shows merely the facing element in its wound form, and that said facing element would be disposed within a backing ring 15 for the form of packing shown in Figure 1, or outside the backing ring 15 if it were desired to produce a piston packing as shown in Figure 2.

In the arrangement shown in Figures 5 and 6 provision is made for interlocking the turns 16 and 17 throughout substantially their whole length, so that they are prevented from moving relatively in a circumferential sense. If such movement were to take place, of course, it would result in puckering one or both of the turns. For producing the interlocking effect the half 17a has its upper edge of castellated shape with substantially rectangular projections 23 interspaced by correspondingly dimensioned recesses 24. The lower edge of the half 16a is correspondingly shaped with projections 23 and recesses 24, so that when the facing element is wound the projections 23 of each half fit snugly into the recesses 24 of the opposite half, thus interlocking the turns 16 and 17 against relative movement in a circumferential sense.

Interlocking in an axial as well as circumferential direction can be obtained by shaping the strip initially to the form shown in Figure 8. This is substantially the same as Figure 6, but in each case the projections 23 and the recesses 24 are of undercut or dovetail shape; also the offset portion is arranged obliquely, as indicated at 22a, the sloping shoulders 16b and 17b being arranged to form butt joints in conjunction with the corresponding mitred end portions 16c and 17c.

If desired a somewhat similar effect may be obtained by making the turns 16 and 17 separately, the lower edge of the turn 16 and the upper edge of the turn 17 being formed with the projections 23 and recesses 24 of dovetail shape. At each end of each turn a projection 23a is provided, these two projections having a combined length which is suitable for engagement within one of the recesses 24 of the turn 17; similarly the ends of the turn 17 have short projections 23a arranged to fit into one of the recesses 24 of the turn 16. When the turn 16 is bent or wound into circular form its two ends 16c and 16d are brought together to form a butt joint, which is indicated at 16e in Figure 9. In a similar manner the ends 17c and 17d come together to form a butt joint 17e, which latter is displaced circumferentially with respect to the butt joint 16e when the facing element is assembled. Although both of the butt joints 16e and 17e are shown relatively close together in Figure 9, it is preferable that they should be displaced considerably, say by 90° or more, in order to reduce leakage of pressure fluid to a minimum.

Another arrangement, utilising two separate strips for the turns 16 and 17, is shown in Figures 11 and 12. In this case each end portion of the strip 16 is widened by a substantially rectangular projection 25, while intermediate its ends the strip 16 is formed with a rectangular recess 26 having a length equal to the combined length of the two projections 25. In a similar manner the strip 17 has end projections 25a and an intermediate recess 26a. When the facing element is assembled the two projections 25 of the turn 16 are brought together to form the butt joint 16e, and are engaged with the recess 26a, which latter prevents the ends of the turn 16 from separating substantially. In a similar manner the projections 25a are brought into engagement with the recess 26 at the diametrically opposite side of the facing element.

A much simplified arrangement is shown in Figure 13, where the turns 16 and 17 are in the form of separate strips, each of uniform width. The ends of the strip 16 are brought together to form a butt joint at 16e, while the corresponding butt joint 17e of the turn 17 is similar, but is angularly displaced with respect to the butt joint 16e so as to reduce leakage.

It will be understood that the arrangements which have been described are given merely as examples and that the invention may be carried into effect in other ways. For instance, in some cases more than two turns may be provided in the facing element, means usually being provided for interlocking some or all of the turns.

What I claim is:

1. An annular packing device comprising in combination with a backing ring of soft rubber or the like, a facing element separate from the backing ring, which facing element is composed of fibrous material in terminate strip form, wound to produce a plurality of turns which are relatively displaced in the axial direction so as to lie side by side in circumferential edge contact with one another, each end of the strip-like fibrous material being arranged to meet substantially another part of said material to form a butt joint, which latter is displaced around the circumference of the facing element with respect to the other butt joint or joints in the fibrous material.

2. An annular packing device comprising in combination with a backing ring of soft rubber or the like, a facing element separate from the backing ring, which facing element is composed of textile material in terminate strip form impregnated with rubber or like substance and wound to produce a plurality of turns which are relatively displaced in the axial direction so as to lie side by side in circumferential edge contact with one another, each end of the strip-like textile material being arranged to meet substantially another part of said material to form a butt joint, which latter is displaced around the circumference of the facing element with respect to the other butt joint or joints in the textile material.

3. An annular packing device comprising in combination with a backing ring of soft rubber or the like a facing element composed of a plurality of terminate strips of fibrous material, such as canvas, which are separate from the backing ring and are wound to form a plurality of turns, said turns being relatively displaced in the axial direction so as to lie side by side in circumferential edge contact with one another and being interposed between the backing ring and one of the members between which a seal is desired.

4. An annular packing device comprising in combination with a backing ring of soft rubber or the like, a facing element separate from the backing ring and comprising a terminate strip of fibrous material such as canvas wound to form a pair of turns which are disposed side by side in edge contact with one another and are interposed between the backing ring and one of the members between which a seal is desired, the strip being offset at the middle of its length to provide a pair of shoulders against which the ends of the strip are arranged to substantially butt.

5. An annular packing device comprising in combination with a backing ring of soft rubber or the like, a separate facing element comprising a plurality of turns of strip-like fibrous material, the strip material of consecutive turns being laid edge to edge around a curved surface of the backing ring and being shaped with projections and recesses which mate to interlock the turns with one another and prevent relative movement of the turns circumferentially.

6. An annular packing device comprising in combination with a backing ring of soft rubber or like material, a separate facing element composed of a pair of turns of fibrous material in strip form laid edge to edge around a curved curface of the backing ring, each end portion of the facing element being increased in width to engage with a recess in the strip constituting the other turn of the facing element.

7. An annular packing device comprising in combination with an endless backing ring of soft rubber or the like, a facing element separate from the backing ring, which facing element is composed of fibrous material in terminate strip form, wound to produce a plurality of turns lying side by side in edge contact with one another, each end of the strip-like fibrous material being arranged to meet substantially another part of said material to form a butt joint, which latter is displaced around the circumference of the facing element with respect to the other butt joint or joints in the fibrous material.

8. An annular packing device comprising in combination with an endless backing ring of soft rubber or the like, a facing element separate from the backing ring, which facing element is composed of textile material in terminate strip form impregnated with rubber or like substance and wound to produce a plurality of turns lying side by side in edge contact with one another, each end of the strip-like textile material being arranged to meet substantially another part of said material to form a butt joint, which latter is displaced around the circumference of the facing element with respect to the other butt joint or joints in the textile material.

9. An annular packing device comprising in combination with an endless backing ring of soft rubber or the like a facing element composed of a plurality of terminate strips of fibrous material, such as canvas, wound to form a plurality of turns which are disposed side by side in edge contact with one another and are interposed between the backing ring and one of the members between which a seal is desired.

10. An annular packing device comprising in combination with an endless backing ring of soft rubber or the like, a facing element comprising a terminate strip of fibrous material such as canvas wound to form a pair of turns which are disposed side by side in edge contact with one another and are interposed between the backing ring and one of the members between which a seal is desired, the strip being offset at the middle of its length to provide a pair of shoulders against which the ends of the strip are arranged to substantially butt.

11. An annular packing device comprising in combination with an endless backing ring of soft rubber or the like, a facing element comprising a plurality of turns of strip-like fibrous material, the strip material of consecutive turns being laid edge to edge around a curved surface of the backing ring and being shaped with projections and recesses which mate to interlock the turns with one another and prevent relative movement of the turns circumferentially.

12. An annular packing device as claimed in claim 1, wherein the turns of the facing element are interlocked against axial and circumferential displacement relative to one another.

13. An annular packing device as claimed in claim 1, wherein the facing element has its turns formed with inter-engaging projections and recesses of undercut shape, such as dovetail shape.

14. An annular packing device as claimed in claim 1, wherein the strip material of the facing element comprises a plurality of thicknesses of canvas or like textile material united together and impregnated with rubber or like material.

PETER WARBORN THORNHILL.